United States Patent [19]

Hamaguchi

[11] 3,947,115
[45] Mar. 30, 1976

[54] OPTICAL ILLUMINATION DEVICE FOR USE IN COPYING MACHINE

[75] Inventor: Hiroshi Hamaguchi, Sakai, Japan

[73] Assignee: Minolta Camera Kabushiki Kaisha, Osaka, Japan

[22] Filed: July 22, 1974

[21] Appl. No.: 490,710

[30] Foreign Application Priority Data
Aug. 9, 1973  Japan.......................... 48-93905[U]

[52] U.S. Cl............. 355/8; 240/41.1; 240/41.35 C; 240/103 B; 355/67; 355/1
[51] Int. Cl.².................... G03B 15/28; G03B 15/32
[58] Field of Search.......... 240/41 R, 41.1, 41.35 R, 240/41.35 C, 41.35 D, 41.37, 103 B; 355/67, 70, 1, 8, 66

[56] References Cited
UNITED STATES PATENTS

| | | | |
|---|---|---|---|
| 2,819,649 | 1/1958 | McLeod et al. | 240/41.1 |
| 3,088,023 | 4/1963 | Ayroldi | 240/41.1 |
| 3,302,519 | 2/1967 | Young | 355/67 X |

OTHER PUBLICATIONS
IBM Technical Disclosure Bulletin, Vol. 14, No. 11, Apr., 1972, Baxter et al., "Document Illuminator...".

Primary Examiner—Richard M. Sheer
Attorney, Agent, or Firm—Wenderoth, Lind & Ponack

[57] ABSTRACT

An optical illumination device for use in a copying machine, which illuminates the original to be copied, with a ribbon of light. The optical illumination device comprises a pair of reflectors respectively having concave, reflective surfaces which comprise individual portions of hollow right elliptical cylinders of different ellipticity. Each of these first and second elliptical cylinders has a pair of line foci and the first and second reflectors are arranged such that one of the line foci of the first elliptical cylinder is substantially in alignment with one of the line foci of the second elliptical cylinder. A line light source is disposed in alignment with the other focus of the first elliptical cylinder while the other focus of the second elliptical cylinder is situated in the vicinity or at a position where the original to be copied is placed.

8 Claims, 6 Drawing Figures

OPTICAL ILLUMINATION DEVICE FOR USE IN COPYING MACHINE

BACKGROUND OF THE INVENTION

The present invention relates to an optical illuminating device for use in a copying apparatus for illuminating the original to be copied on a sheet of copying material.

A diversity of copying machines, whatever type of copying process they employ, are now commercially available. Most of the commercially available copying machines are bulky and the recent trend in the concern of the related industry is development of relatively small-sized copying machines. Though there are numerous methods of reducing the size of a copying machine, one of the relatively small-sized copying machines that have heretofore been developed employs for its optical system an image transmitter composed of a plurality of SELFOC (a trademark registered in Japan and owned by Nippon Sheet Glass Co., Ltd.) lenses in a bundled configuration.

The SELFOC lens refers to an image transmitting optical fiber made of glass or synthetic resin and having a refractive index distribution in a cross section thereof that varies consecutively and parabolically outwards from a center portion thereof, such refractive index distribution satisfying the following equation; $n = N(1 - ar^2)$, wherein N is a refractive index at the center, n is a refractive index at a distance r from the center and a is a positive constant. The SELFOC lens and the image transmitter formed by a bundle of SELFOC lenses are described in the U.S. Pat. No. 3,658,407, patented on Apr. 25, 1972, and therefore, reference may be made thereto for the details thereof.

In the copying machine wherein the optical system utilizes the particular image transmitter composed of the SELFOC lenses bundled side by side by the use of an adhesive material, the inventor has found that a great amount of light can enter the particular image transmitter avoiding to increase flared light if a beam of light travelling towards a transparent support for supporting thereon the original to be copied impinges upon the transparent support at an angle of incidence in the vicinity of 45°. Accordingly, in the case where the particular image transmitter is to be employed during manufacture of a copying machine for the purpose of reducing the size of the resultant copying machine, the particular image transmitter has to be arranged in position to satisfy the above mentioned particular and, in addition thereto, an optical illuminating device capable of emitting a relatively large amount of light has to be employed in the copying machine. Both of these requirements are important factors to be taken into consideration in order to manufacture a copying machine in a size as compact as possible.

According to the prior art, a copying machine wherein the optical illumination is designed such as shown in FIG. 1 is provided. Referring to FIG. 1, the optical illumination device comprises a single elliptical reflector M having a concave, reflective wall $M_1$ which comprises a portion of the wall of a hollow right elliptical cylinder such as shown by C in a broken curved line. The right elliptical cylinder C has two imaginary parallel line foci $A_1$ and $A_2$ and a line light source L, for example, a tubular electrical lamp, is disposed in a position with the longitudinal axis thereof in alignment with one of the line foci $A_1$, the other line focus $A_2$ being parallelly occupied by one of the surfaces of a transparent support 4 on which the original P to be copied is stationarily placed. In practice, the position of the line focus $A_2$ relative to the transparent support 4 is adjusted, in consideration of the presence of a particular refractive index of a transparent glass material forming the transparent support 4, by a shade 3 positioned such that the angle of incidence can be in the vicinity of 45°.

In the prior art copying machine of the arrangement as hereinbefore described, light emitted from the tubular light source L and after having been reflected by the concave wall $M_1$ illuminates an elongated portion of the original P placed on the transparent support 4, which elongated portion is schematically indicated by B and is to be understood as extending in a direction at right angles to the plane of the drawing of FIG. 1. The light having impinged upon the original P and reflected therefrom in a substantially slit-like configuration is subsequently projected through the particular image transmitter 1 onto a light sensitive sufrace 2 on which an image of the original P is exposed, light sensitive surface 2 being either a copying material itself or a known photoreceptor.

In the prior art arrangement so far described, since the light source L is positioned relatively close to the particular image transmitter 1, some or all of the optical fibers forming the particular image transmitter 1 and/or an adhesive material used to bundle the optical fibers to provide the particular image transmitter 1 tend to be softened by the heat of the light source L so that the performance characteristics of the particular image transmitter is adversely affected. In addition, it has been found that the support 4 and/or the particular image transmitter 1 are deteriorated in quality and that, since the amount of light which illuminates the elongated portion of the original P is defined by light reflected from an elongated portion of the concave wall $M_1$ between a pair of parallely spaced line positions $T_1$ and $T_2$ which appear as points in FIG. 1 because of the cross sectional representation of the illumination device, it is relatively small.

SUMMARY OF THE INVENTION

Accordingly, an essential object of the present invention is to provide an improved, compact optical illumination device for use in a copying machine, which is capable of emitting a relatively great amount of light for illuminating the original to be copied by the copying machine, with substantial elimination of the above described disadvantages.

Another important object of the present invention is to provide an improved, compact optical illumination device of the type referred to above, wherein the source of light is sufficiently spaced from the transparent support and also from the particular image transmitter so as to minimize the thermal influence which may otherwise be exerted upon the transparent support and the particular image transmitter.

According to the present invention, there is disclosed an optical illumination device for illuminating with a ribbon of light the original to be copied by a copying machine. The optical illumination device herein disclosed is particularly suited for use in a copying machine wherein the optical system for transmitting an image of the original to be copied towards a light sensitive element which may be either a copying material or a photoreceptor drum or belt comprises the particular image transmitter.

The optical illumination device according to the present invention comprises first and second concave reflectors which comprise respective portions of the walls of hollow right elliptical cylinders of different ellipticity, each of which first and second concave reflectors has a pair of parallel line foci. These first and second reflectors are arranged such as to permit one of the line foci of the elliptical cylinder of either of the first and second reflector to be shared by one of the line foci of the elliptical cylinder of the other reflector with the major axes of these elliptical cylinders being out of alignment.

A tubular light source is positioned in alignment with the other line focus of the elliptical cylinder of the first reflector while the other line focus of the elliptical cylinder of the second reflector is positioned at the upper surface of the transparent support on which the original to be copied is placed and immediately above the particular image transmitter.

BRIEF DESCRIPTION OF THE DRAWINGS

These and other objects and features of the present invention will become readily understood from the following description taken in conjunction with preferred embodiments thereof with reference to the accompanying drawings, in which.

DETAILED DESCRIPTION OF THE INVENTION

Figure 1:
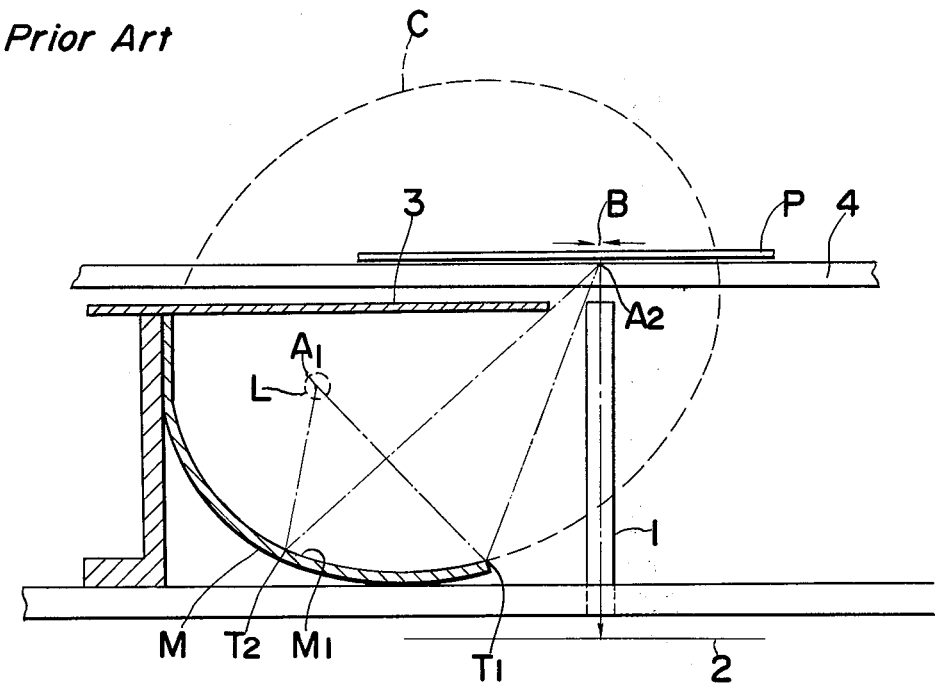
FIG. 1 is a cross sectional view of the prior art optical illumination device, reference to which has been already made in the foregoing description.

Before the description of the present invention proceeds, it should be noted that, for the sake of brevity, like parts are designated by like reference characters throughout the accompanying drawings.

Figure 2:
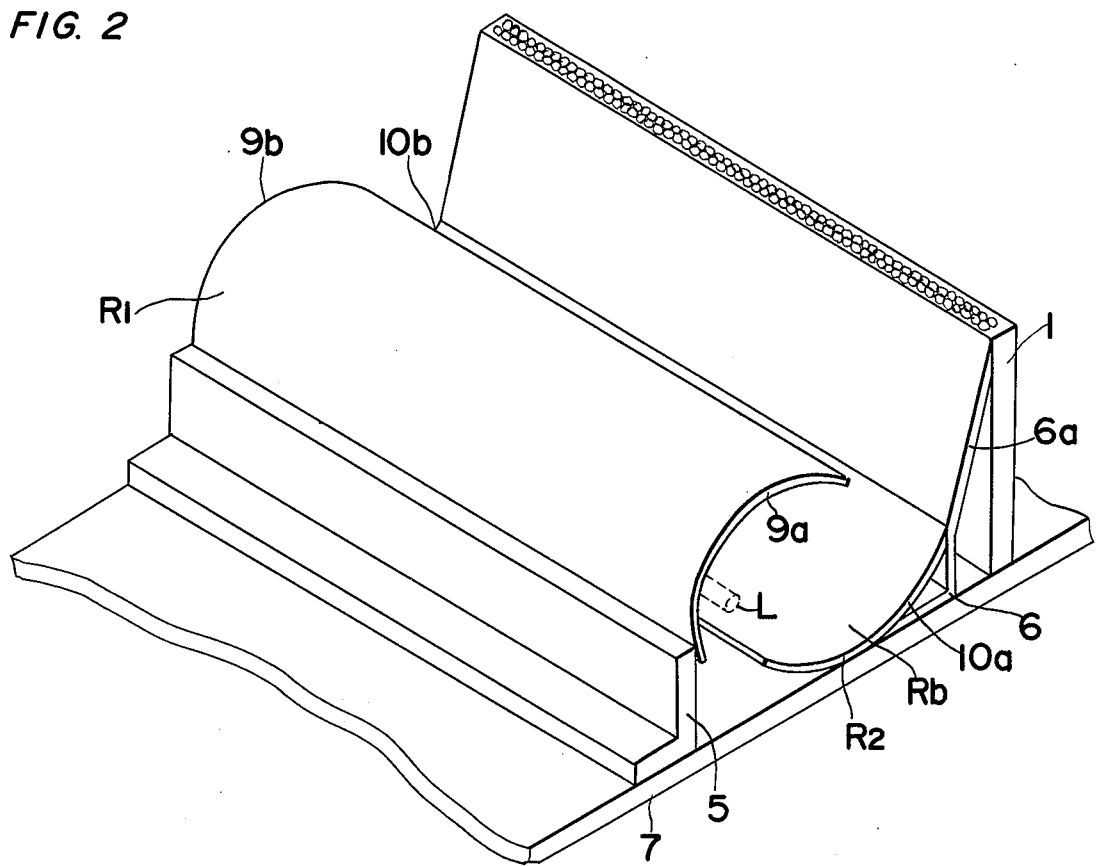
FIG. 2 is a schematic perspective view of the optical illumination device constructed in accordance with the preferred embodiment of the present invention.
Figure 3:
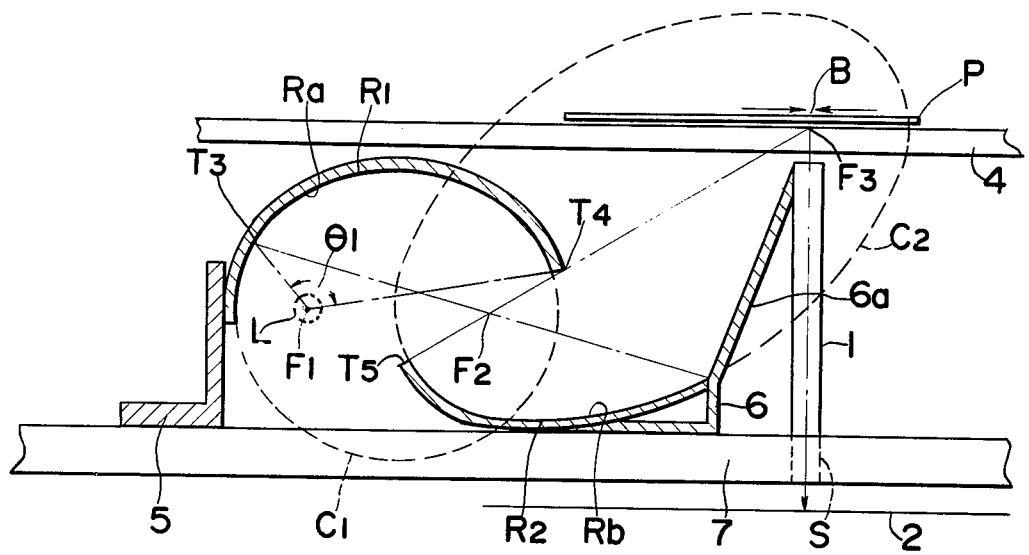
FIG. 3 is a cross sectional view of the illumination device, shown in FIG. 2.

Referring now to FIGS. 2 and 3, the optical illumination device according to the present invention comprises a base support 7 carrying a pair of elliptical reflectors $R_1$ and $R_2$ of different ellipticity; the reflector $R_1$ being rigidly secured to base support 7 through a substantially L-sectioned beam member 5 and the reflector $R_2$ being rigidly secured to base support 7 through a similarly sectioned beam member 6. The base support 7 also carries a particular image transmitter 1 of the type referred to hereinbefore which upwardly extends at right angles to the plane of the base support 7. It should be noted that the base support 7 should be understood as having a slot S in alignment with the bottom, that is, exit, of the image transmitter 1.

As best shown in FIG. 3, situated above the top, that is, entrance, of the image transmitter 1 and extending in substantially parallel relation to the base support 7 is a transparent support 4 on which the original P to be copied may be placed.

Still referring to FIG. 3, the reflector $R_1$ has a concave, reflective surface $Ra$ which comprises a portion of the wall of a hollow right elliptical cylinder $C_1$, the latter being shown in a broken curved line. The elliptical cylinder $C_1$ has two imaginary parallel line foci $F_1$ and $F_2$. On the other hand, the reflector $R_2$ has concave, reflective surface $Rb$ which comprises a portion of the wall of a hollow right elliptical cylinder $C_2$ shown in a broken curved line. The elliptical cylinder $C_2$ has two imaginary line foci, one being designated by $F_3$ and the other sharing with one of the line foci $F_2$. It should be noted that the elliptical cylinders $C_1$ and $C_2$ are positioned relative to each other in such a manner that, while the respective major axes of these elliptical cylinders $C_1$ and $C_2$ intersect each other at the common line focus $F_2$, the line focus $F_3$ located substantially immediately above the entrance of the image transmitter 1 and in the vicinity of or at one of the surfaces of the transparent support 4 which contacts the original to be copied when original P is placed thereon. In practice, determination of the position of the line focus $F_3$ requires that the particular refractive index of the transparent support 4 be taken into consideration.

In the arrangement so far described, while the rear edge of the reflector $R_1$ is secured to the beam member 5, the front edge of reflector $R_1$ and the rear edge of the reflector $R_2$ extend in parallel relation to each other and are located on the same plane that connects the line foci $F_2$ and $F_3$. Therefore, it will be seen that rays of light travelling towards the line focus $F_3$ after having been reflected by the concave, reflective surface $Rb$ of the reflector $R_2$ impinge upon the original P at an angle of incidence in the vicinity of 45°.

Referring back to FIGS. 2 and 3, the line light source L, which may, for example, be a tubular electric lamp, is supported in position in alignment with the line focus $F_1$. To this end, a pair of end places (not shown) are in practice employed, which are respectively fixed to the opposite ends of the associated reflectors $R_1$ and $R_2$. In other words, one end plate is fixed to the ends 9a and 10a of the reflectors $R_1$ and $R_2$ and the other end plate is fixed to the ends 9b and 10b of the reflectors $R_1$ and $R_2$. These end plates, though not shown, should be understood as having holes formed in alignment with each other and also with the line focus $F_1$, through which holes both end portions of the line light source L are supported. The opposite end extremities of this line light source L are, although not shown, received by corresponding sockets for electrical connection to a source of electric power.

With the foregoing arrangement of the optical illumination device, assuming that the line light source L is switched on, rays of light emitted from the line light source L are first reflected by an elongated portion of the concave, reflective surface $Ra$ between positions $T_3$ and $T_4$ and then focused upon the line focus $F_2$. The rays of light thus focused upon the line focus $F_2$ act as if an electric lamp is positioned in alignment with the focus $F_2$ and are reflected by an elongated portion of the concave, reflective surface $Rb$ between the front and rear edges thereof and finally focused upon the line focus $F_3$, thereby impinging upon the original P on the transparent support 4 at an angle of incidence in the vicinity of 45°. Thus, the elongated portion B of the original P on the transparent support 4 can be illuminated by a great amount of light which substantially represents a ribbon of light extending in parallel relation to the elongated portion B of the original P.

Figure 4:
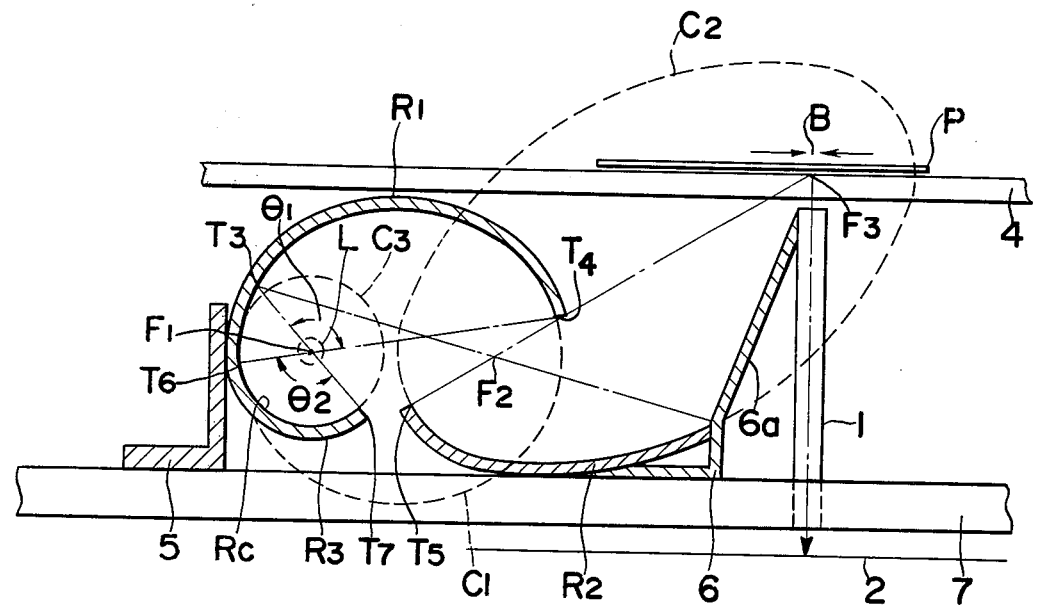
FIG. 4 is a view similar to FIG. 3, showing another preferred embodiment of the present invention.

Referring now to FIG. 4, wherein another preferred embodiment of the present invention is shown, the optical illumination device shown in FIG. 4 slightly differs from that shown in FIG. 3 in that it additionally includes a reflector $R_3$ having a concave, reflective surface Rc which comprises a portion of the wall of a circular cylinder shown by a broken curved line $C_3$. This reflector $R_3$ is positioned such that the line focus of the concave, reflective surface Rc is commonly shared by the line focus $F_1$ and, therefore, is in alignment with the line light source L.

The reflector $R_3$ may be integrally formed with the reflector $R_1$ so that the concave, reflective surface Rc is contiguous to the concave, reflective surface Ra of the reflector $R_1$.

It should be noted that, in the arrangement as hereinbefore described, the position $T_4$, the line focus $F_1$ and position $T_6$ are all in alignment with each other in a direction at right angles to the longitudinal axis of the line light source L, while the position $T_3$, the line focus $F_1$ and position $T_7$ are all in alignment with each other in the same direction. Therefore, while rays of light emitted from the line light source L and reflected by the concave, reflective surface Ra between the positions $T_3$ and $T_4$ are utilized to illuminate the original P in the manner as hereinbefore described in conjunction with the preceding embodiment, rays of light emitted from the same line light source L and reflected by the concave, reflective surface Rc of the reflector $R_3$ are also utilized to illuminate the original P together with the rays of light that have been reflected from the concave, reflective surface Ra. More specifically, the rays of light reflected from the concave, reflective surface Rc are focused on the line focus $F_1$, that is, return back to the light source L, and are then diffused towards the concave, reflective surface Ra of the reflector $R_1$ thereby being superposed upon the rays of light travelling from the line light source L towards the concave, reflective surface Ra.

The arrangement of the optical illumination device of FIG. 4 is particularly advantageous in that, due to the fact that the angles $\theta_1$ and $\theta_2$ are equal to each other, the light from the light source L can be utilized in an amount expressed by the following formular to illuminate the original P on the transparent support 4:

$(\theta_1 + \theta_2)/2\pi \times 100\%$. Hence, $2 \times (\theta_1/2\pi \times 100\%)$ This is substantially twice the amount of light available in the optical illumination device wherein the light from the light source L is available only in an amount corresponding to $(\theta_1/2\pi \times 100\%)$.

Thus, it has now become clear that the maximum amount of light available to illuminate the original P on the transparent support by the arrangement of FIG. 4 is greater than that available in the arrangement of FIG. 3.

Figure 5:
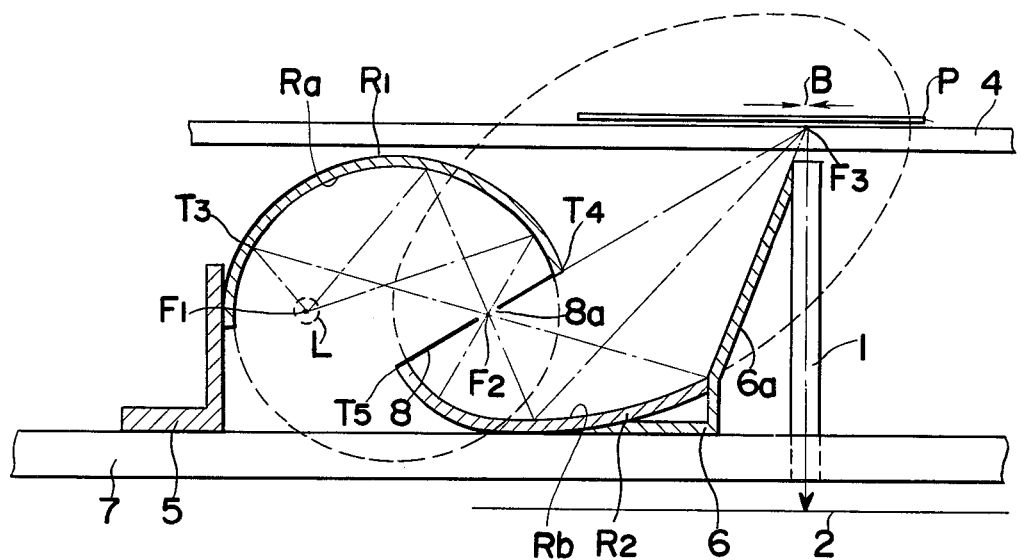
FIG. 5 is a view similar to FIG. 3, showing a further preferred embodiment of the present invention.

In any of the arrangements shown in FIGS. 3 and 4, a shading member may be provided such as shown by 8 in FIG. 5 for shading a portion of the beam of light passing through the line focus $F_2$ thereby to avoid flares and to improve the contrast of an image of the original P to be copied.

Referring to FIG. 5, the shading member 8 is shown as applied to the arrangement of FIG. 3 and has both side edges secured to the front and rear edges of the individual reflector $R_1$ and $R_2$. The shading member 8 has a slit 8a which, when shading member 8 is arranged in position in the manner as hereinbefore described, extends in parallel relation to and in alignment with the line focus $F_2$ so that only the portion of the beam of light passing through the line focus $F_2$ after having been reflected from the concave, reflective surface Ra can travel therethrough towards the concave, reflective surface Rb of the reflector $R_2$. Preferably, one or both of the opposite surfaces of the shading member 8 may be polished to provide reflective surfaces facing, respectively, the concave, reflective surfaces Ra and Rb.

It should be noted that the shading member 8 also acts to minimize thermal transmission to the image transmitter 1.

In any of the foregoing embodiments shown in FIGS. 2 to 5, reference numeral 6a represents a barrier preferably made of thermal insulating material, which barrier may act not only to prevent thermal transmission to the image transmitter 1, but also to support the image transmitter 1 in the upright position as shown. This barrier 6a may be integrally formed with the beam member 6.

Figure 6:
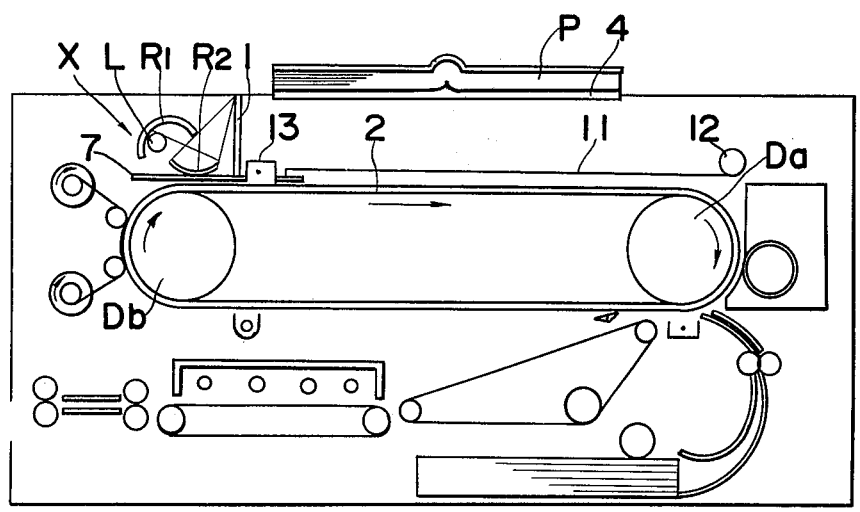
FIG. 6 is a schematic cross sectional view of a copying machine employing the optical illumination device shown in FIGS. 2 and 3, which is used to illustrate a manner by which the optical illumination device is supported in position within the copying machine.

The optical illumination according to any of the foregoing embodiments of the present invention is, in practice, accommodated within a copying machine in such a manner as shown in FIG. 6, reference to which will now be made.

Since the copying machine to which the present invention is applicable may be of any known type, the details thereof will not be described for the sake of brevity. However, the light sensitive surface 2 used in the copying machine so far shown comprises an endless belt operatively suspended between drive and driven drums Da and Db in any known manner for intermittent movement in one direction as indicated by the arrow and having the outer surface applied with a known photoconductive layer.

The illumination device according to the present invention, generally indicated by X, is supported in position within the copying machine by means of any suitable guide arrangement (not shown) for movement in a direction parallel to the direction of movement of the light sensitive surface 2. For effecting the movement of the optical illumination device so as to illuminate consecutive elongated portions of the original P to be copied, the device X is connected by a cable 11 to a take-up pulley 12 which is in turn operatively coupled to a suitable drive mechanism (not shown), which drive mechanism is operated to rotate the take-up pulley 12 only when the light sensitive surface assumes a standstill position, that is, when the drive drum Da is not operated.

It is clear that, as the take-up pulley 12 winds up the cable 11, the optical illumination device X is pulled in a direction toward the take-up pulley 12 while illuminating consecutive portions of the original P and, thereafter, automatically returned to the original position, for example, by the action of tension spring (not shown). During the movement of the optical illumination device X in the direction toward the take-up pulley 12, an electrostatic charger 13 carried by the base support 7 of the device X at one side of the image transmitter 1 opposed to the reflector arrangement charges the light sensitive surface 2 and a consecutive image of the original illuminated by the device X is projected on the electrostatically charged light sensitive surface 2.

Thereafter, developing and other required processes take place in the known manner, description of which is herein omitted for the sake of brevity.

Although the present invention has been fully described by way of example with reference to the accompanying drawings, it should be noted that various changes and modifications are apparent to those skilled in the art, these changes and modifications being to be understood as included within the true scope of the present invention unless otherwise they depart therefrom.

What is claimed is:

1. An optical illumination device for use in a copying apparatus of the type wherein an object is to be illuminated and an image thereof is to be projected through a particular image transmitter formed of a plurality of graded index fibers in bundled configuration to a light sensitive surface, said device comprising:

first and second reflectors respectively having first and second concave, reflective surfaces which comprise portions of first and second concave walls defining hollow right elliptical cylinders, each having first and second line foci, said first and second reflective surfaces being oppositely disposed with one of the line foci of the elliptical cylinder of said first reflective surface coinciding with one of the line foci of the elliptical cylinder of said second reflective surface, the other foci of said cylinders of said first and second reflective surfaces being positioned on opposite sides of the commonly shared foci, said first and second reflective surfaces each having an edge extending parallel to said commonly shared line foci at a position in an imaginary plane connecting said commonly shared foci and the other line focus of said cylinder of said second reflective surface, means to position an object at said other line focus of said cylinder of said second reflective surface, and an elongated source of light disposed along the other focus of said cylinder of said first reflective surface to illuminate an object, whereby rays of light travelling towards said other focus of said cylinder of said second reflective surface from said light source after having first been reflected by said first reflective surface, then pass through the commonly shared foci and are finally reflected by said second reflective surface.

2. An optical illumination device as claimed in claim 1, further comprising a shading member having a slit extending in parallel relation to any of the line foci, said shading member being disposed with said slit located in alignment with said commonly shared foci.

3. An optical illumination device as claimed in claim 1, further comprising a third reflector having a third concave, reflective surface which comprises a portion of the concave wall of a hollow circular cylinder, said third reflective surface having a line focus, said third reflector being positioned relative to said first reflector with said line focus of said third reflective surface coinciding with said other line focus of said first reflective surface, such that rays of light that have been emitted from the light source in a direction opposite to said rays of light from said light source are diffused towards said first reflective surface after having been reflected by said third reflective surface and then passed through said light source.

4. An optical illumination device as claimed in claim 3, further comprising a shading member having a slit extending in parallel relation to any of the line foci, said shading member being disposed with said slit located in alignment with said commonly shared foci.

5. An optical illumination device as claimed in claim 3, wherein said third surface is integrally contiguous with said first surface.

6. An optical illumination device as claimed in claim 1, further comprising heat shielding means for preventing transmission of thermal energy from said light source and said surfaces to a bundled image transmitter, said shielding means comprising a barrier formed of thermal insulating material extending from an edge of said second surface to a position adjacent said other line focus of said cylinder of said second surface.

7. An optical illumination device as claimed in claim 1, further comprising an image transmitter formed of a plurality of graded index fibers in a bundled configuration, said fibers of said image transmitter having first ends positioned closely adjacent said other line focus of said cylinder of said second surface and extending therefrom in a direction substantially perpendicular to said object positioning means.

8. In a copying apparatus of the type including a light sensitive surface means for receiving a projected image of an object to be copied; electrostatic charging means for charging a portion of said light sensitive surface means; and optical illumination means for exposing and projecting an image of an object onto a charged portion of said light sensitive surface means; the improvement wherein:

said optical illumination means comprises first and second reflectors respectively having first and second concave, reflective surfaces which comprise portions of first and second concave walls defining hollow right elliptical cylinders, each having first and second line foci, said first and second reflective surfaces being oppositely disposed with one of the line foci of the elliptical cylinder of said first reflective surface coinciding with one of the line foci of the elliptical cylinder of said second reflective surface, the other foci of said cylinders of said first and second reflective surfaces being positioned on opposite sides of the commonly shared foci, said first and second reflective surfaces each having an edge extending parallel to said commonly shared line foci at a position in an imaginary plane connecting said commonly shared foci and the other line focus of said cylinder of said second reflective surface, means to position an object at said other line focus of said cylinder of said second reflective surface, and an elongated source of light disposed along the other focus of said cylinder of said first reflective surface to illuminate said object, and further comprising:

a support mounted for movement along said light sensitive surface means, said optical illumination means and said electrostatic charging means being positioned on said support; and means for moving said support, and thus said electrostatic charging means and said optical illumination means, along said light sensitive surface means, thereby first charging a portion of said light sensitive surface means and thereafter exposing the thus charged portion with an image of an object.

* * * * *